(12) United States Patent
Bohm et al.

(10) Patent No.: US 8,739,187 B2
(45) Date of Patent: May 27, 2014

(54) LEGACY APPLICATION INTEGRATION WITHIN A BUNDLE FRAMEWORK

(75) Inventors: Fraser P. Bohm, Salisbury (GB); Philipp Breitbach, Leipzig (DE); Benjamin D. Cox, Winchester (GB); Ivan D. Hargreaves, Southampton (GB); Matthew A. Webster, Hook (GB)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 13/229,205

(22) Filed: Sep. 9, 2011

(65) Prior Publication Data

US 2013/0067500 A1 Mar. 14, 2013

(51) Int. Cl.
G06F 9/44 (2006.01)

(52) U.S. Cl.
USPC .......................................... 719/320

(58) Field of Classification Search
None
See application file for complete search history.

(56) References Cited

U.S. PATENT DOCUMENTS

| | | |
|---|---|---|
| 6,272,521 B1 | 8/2001 | Jablonski et al. |
| 7,886,286 B2 | 2/2011 | Rapicault et al. |
| 7,890,945 B2 | 2/2011 | Jurkiewicz et al. |
| 8,230,389 B2 | 7/2012 | Beltowski et al. |
| 8,375,110 B2 | 2/2013 | Jung et al. |
| 8,448,163 B2 | 5/2013 | Backhouse |
| 2004/0194059 A1 | 9/2004 | Akella et al. |
| 2005/0154785 A1 | 7/2005 | Reed et al. |
| 2005/0210124 A1 | 9/2005 | Chua |
| 2006/0242625 A1 | 10/2006 | Fey |
| 2007/0260633 A1* | 11/2007 | Rapicault et al. ......... 707/103 R |
| 2008/0046882 A1 | 2/2008 | Blackhouse |
| 2009/0070792 A1 | 3/2009 | Cable |
| 2009/0144726 A1 | 6/2009 | Felts |
| 2009/0276767 A1 | 11/2009 | Brannen, Jr. et al. |
| 2009/0300093 A1 | 12/2009 | Griffiths et al. |
| 2010/0017797 A1 | 1/2010 | Hwang |
| 2010/0229165 A1* | 9/2010 | Normington et al. ......... 717/166 |
| 2011/0010702 A1 | 1/2011 | Vrushabendrappa et al. |
| 2011/0307877 A1 | 12/2011 | Lambert et al. |
| 2012/0036252 A1 | 2/2012 | Shi et al. |
| 2012/0204168 A1 | 8/2012 | Charters et al. |
| 2012/0246316 A1* | 9/2012 | Ramu et al. .................. 709/226 |

OTHER PUBLICATIONS

Erik Wistrand and Gunnar Ekolin, "Everything can be a bundle—Making OSGi bundles of Java legacy code" Jun. 2008, OSGi Alliance, pp. 1-29, retrieved from http://www.osgi.org/wiki/uploads/CommunityEvent2008/30_knopflerfish-osgi-berlin-2008.pdf on Mar. 19, 2013.*

(Continued)

*Primary Examiner* — H S Sough
*Assistant Examiner* — William C Wood
(74) *Attorney, Agent, or Firm* — Lee Law, PLLC; Christopher B. Lee (57) ABSTRACT

A bundle entering a set of starting and active bundles within a bundle framework is detected by a controller bundle executed by a processor. A determination is made as to whether a manifest of the bundle includes an extension header that identifies at least one legacy application. In response to determining that the manifest of the bundle includes the extension header that identifies the at least one legacy application, at least one application proxy object is created for at least one defined entry point class of the at least one legacy application identified by the extension header. The created at least one application proxy object is registered as a service within a service registry of the bundle framework.

24 Claims, 6 Drawing Sheets

(56) References Cited

OTHER PUBLICATIONS

Author Unknown, Java applications that comply with OSGi, Online Information Center: CICS Transaction Server for z/OS, Version 4.2, Jun. 18, 2011, pp. 1-3, International Business Machines Corporation, Published on the World Wide Web at: https://publib.boulder.ibm.com/infocenter/cicsts/v4r2/index.jsp?topic=/com.ibm.cics.ts.java.doc/topics/planning_osgi.html.

Author Unknown, Updating OSGi bundles, Online Information Center: CICS Transaction Server for z/OS, Version 4.2, Jun. 18, 2011, pp. 1-2, International Business Machines Corporation, Published on the World Wide Web at: http://publib.boulder.ibm.com/infocenter/cicsts/v4r2/index.jsp?topic=/com.ibm.cics.ts.java.doc/JVMserver/updating_osgi.html.

Anne H. H. Ngu, et al., Semantic-Based Mashup of Composite Applications, IEEE Transactions on Services Computing, Feb. 23, 2010, pp. 2-15, vol. 3, No. 1, IEEE Computer Society, Published on the World Wide Web.

Author Unknown, OSGi Technology, Webpage/site: OSGi.org, 2011, pp. 1-5, OSGi Alliance, Published on the World Wide Web at: http://www.osgi.org/About/Technology.

Author Unknown, Writing Bundles, Framework Professional Edition Package, 2008, pp. 1-14 (plus 2 pages with table of contents/citation), ProSyst Software GmbH, Published on the World Wide Web at: http://dz.prosyst.com/pdoc/mBS_PE/um/framework/getting_started/writingBundles.html.

Authors Unknown, How to use OSGi from java application, Webpage/site: StackOverflow, May 2010, pp. 1-2, Stack Exchange, Inc., Published on the World Wide Web at: http://stackoverflow.com/questions/2756784/how-to-use-osgi-from-java-application.

United States Patent and Trademark Office, Office Action for U.S. Appl. No. 13/229,295, Aug. 8, 2013, pp. 1-19, Alexandria, VA, USA.

Lashonda T. Jacobs, Examiner, United States Patent and Trademark Office, Notice of Allowance for U.S. Appl. No. 13/229,295, Jan. 10, 2014, pp. 1-10, Alexandria, VA, USA.

* cited by examiner

LEGACY APPLICATION INTEGRATION WITHIN A BUNDLE FRAMEWORK

RELATED APPLICATIONS

This application is related to concurrently filed U.S. utility patent application Ser. No. 13/229,295, titled "PROVIDING EXTERNAL ACCESS TO SERVICE VERSIONS VIA A BUNDLE FRAMEWORK," which is incorporated herein by reference in its entirety.

BACKGROUND

The present invention relates to bundle frameworks, such as Open Service Gateway Initiative (OSGI®) bundle frameworks. More particularly, the present invention relates to legacy application integration within a bundle framework.

Application servers and transaction processing servers may invoke programs written using the Java™ programming language using a method known as "reflection." Using reflection, a particular class name, method name, and signature are searched from the class path and executed.

BRIEF SUMMARY

A method includes detecting, via a controller bundle executed by a processor, a bundle entering a set of starting and active bundles within a bundle framework; determining whether a manifest of the bundle comprises an extension header that identifies at least one legacy application; creating, in response to determining that the manifest of the bundle comprises the extension header that identifies the at least one legacy application, at least one application proxy object for at least one defined entry point class of the at least one legacy application identified by the extension header; and registering the created at least one application proxy object as a service within a service registry of the bundle framework.

A system includes a memory that stores a bundle framework and a processor programmed to detect, via a controller bundle executed by the processor, a bundle entering a set of starting and active bundles within the bundle framework; determine whether a manifest of the bundle comprises an extension header that identifies at least one legacy application; create, in response to determining that the manifest of the bundle comprises the extension header that identifies the at least one legacy application, at least one application proxy object for at least one defined entry point class of the at least one legacy application identified by the extension header; and register the created at least one application proxy object as a service within a service registry of the bundle framework.

A computer program product includes a computer readable storage medium including computer readable program code, where the computer readable program code when executed on a computer causes the computer to detect a bundle entering a set of starting and active bundles within a bundle framework; determine whether a manifest of the bundle comprises an extension header that identifies at least one legacy application; create, in response to determining that the manifest of the bundle comprises the extension header that identifies the at least one legacy application, at least one application proxy object for at least one defined entry point class of the at least one legacy application identified by the extension header; and register the created at least one application proxy object as a service within a service registry of the bundle framework.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides legacy application integration within a bundle framework, such as an Open Services Gateway Initiative (OSGI®) framework. The present subject matter extends a bundle manifest application, such as an OSGI® manifest application with a new header that specifies one or more entry point classes into the application. Using OSGI® as an example implementation and a Java™ programming language application as a legacy application, a Java™ language archive (JAR) that includes one or more original legacy applications is converted into a new OSGI® bundle. The conversion to an OSGI® bundle may be performed either by altering the JAR's manifest (found at META-INF/MANIFEST.MF inside the JAR), or by wrapping the JAR inside another JAR and adding the MANIFEST headers to the "outer JAR" to make it a bundle (e.g., where tampering with the original JAR is prohibited for some reason). Neither of these conversion techniques requires changes to the binaries of the legacy applications. A new controller bundle is also installed as an OSGI® bundle. The new controller bundle operates as a listener mechanism and interfaces between the new OSGI® bundle that includes one or more legacy Java™ language application binaries and the OSGI® service registry. The new controller bundle registers a set of OSGI® services that hold information about individual entry point classes in response to the OSGI® bundle being started within the OSGI® framework. The new controller bundle loads an entry point class and calls its entry point method in response to an instruction to execute the legacy application at the respective entry point.

The subject matter described herein provides legacy application integration within a bundle framework. It should be noted that the present description utilizes the phrase "legacy application" to refer to any application written using a programming language, such as the Java™ programming language or other application programming language, for a platform other than a bundle platform/framework. Further, the phrases "bundle framework" or "bundle platform" refer to any bundle execution environment, such as an Open Service Gateway Initiative (OSGI®) framework, that supports execution of bundles defined by the respective framework standards appropriate for the given execution environment. Certain of the examples below utilize OSGI® bundles and an OSGI® framework for ease of description purposes. However, this is not to be considered limiting as the present subject matter may be implemented within other bundle frameworks as appropriate for a given implementation.

As such, the present subject matter provides technology that allows execution of legacy (e.g., non-OSGI®) applications within a bundle framework, such as an OSGI® framework, within an application server, transaction processing server, or other server as appropriate for a given implementation. The legacy applications may be executed within the bundle framework without altering the binary executable of the application. As such, the present subject matter reduces the workload of altering, recompiling, and retesting the legacy application. Further, the present subject matter improves integration because the legacy application source code may not be available or licensing restrictions may prohibit recompiling or altering a binary distribution, and such limitations may prevent reconstructing the application for execution within the bundle framework.

It should be noted that conception of the present subject matter resulted from recognition of certain limitations associated with conventional methods of invocation of programs written using the Java™ programming language and recognition of a resulting inability to integrate legacy Java™ programming language applications into an OSGI® framework. For example, using reflection, the class path is static for a lifetime of a Java™ virtual machine (JVM). As such, adding, modifying, or removing an application involves restarting the entire JVM, which is both time-consuming and destructive to any other applications that are running in the same JVM. Further, within an OSGI® framework, applications may be installed as "bundles." Each bundle has a separate class loader. The class loader is used to load a class from the bundle. However, application servers and transaction processing servers do not have the class loader information and only have a class name. The present subject matter improves invocation of programs that are written within a legacy programming language, such as the Java™ programming language (or other language as appropriate for a given implementation), by application servers and transaction processing servers by providing for integration of legacy applications within a bundle framework, such as an OSGI® framework, as described above and in more detail below. The application binary files do not need to be modified. As such, improved legacy application integration into application servers and transaction processing servers may be obtained through using the present subject matter.

The legacy application integration within a bundle framework described herein may be performed in real time to allow prompt integration of legacy applications within a bundle framework. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
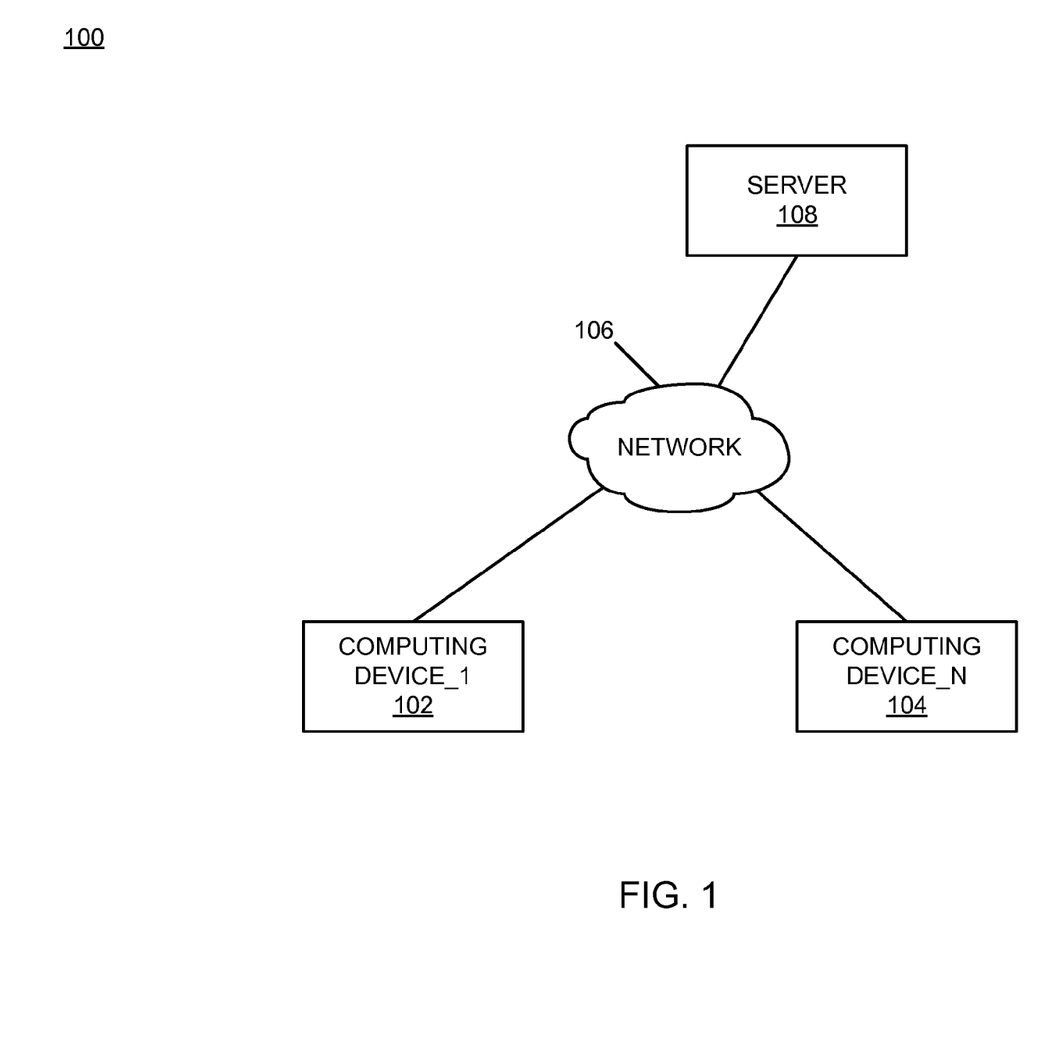
FIG. 1 is a block diagram of an example of an implementation of a system for automated legacy application integration within a bundle framework according to an embodiment of the present subject matter.

FIG. 1 is a block diagram of an example of an implementation of a system 100 for automated legacy application integration within a bundle framework. A computing device_1 102 through a computing device_N 104 communicates via a network 106 with a server 108. For purposes of the present examples, the computing device_1 102 through the computing device_N 104 may be considered client-type devices, while the server 108 may be considered either an application server or a transaction processing server. However, any other server appropriate for a given implementation may be used.

Any of the computing device_1 102 through the computing device_N 104 and/or the server 108 may provide automated legacy application integration into a bundle framework. As such and as will be described in more detail below in association with FIG. 2 through FIG. 6, for purposes of the present examples, the automated legacy application integration within a bundle framework is based upon installation of a legacy application within a new bundle into a bundle framework at the server 108. Within the examples below, the automated legacy application integration within a bundle framework provides run-time integration of legacy applications within the bundle framework of the server 108.

It should be noted that the computing device_1 102 through the computing device_N 104 may be portable computing devices, either by a user's ability to move the respective computing device to different locations, or by the computing device's association with a portable platform, such as a plane, train, automobile, or other moving vehicle. For example, the computing device_1 102 through the computing device_N 104 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server 108 may include any device capable of providing data for consumption by a device, such as the computing device_1 102 through the computing device_N 104, via a network, such as the network 106. As such, the server 108 may include an application server, transaction processing server, or other server device.

Figure 2:
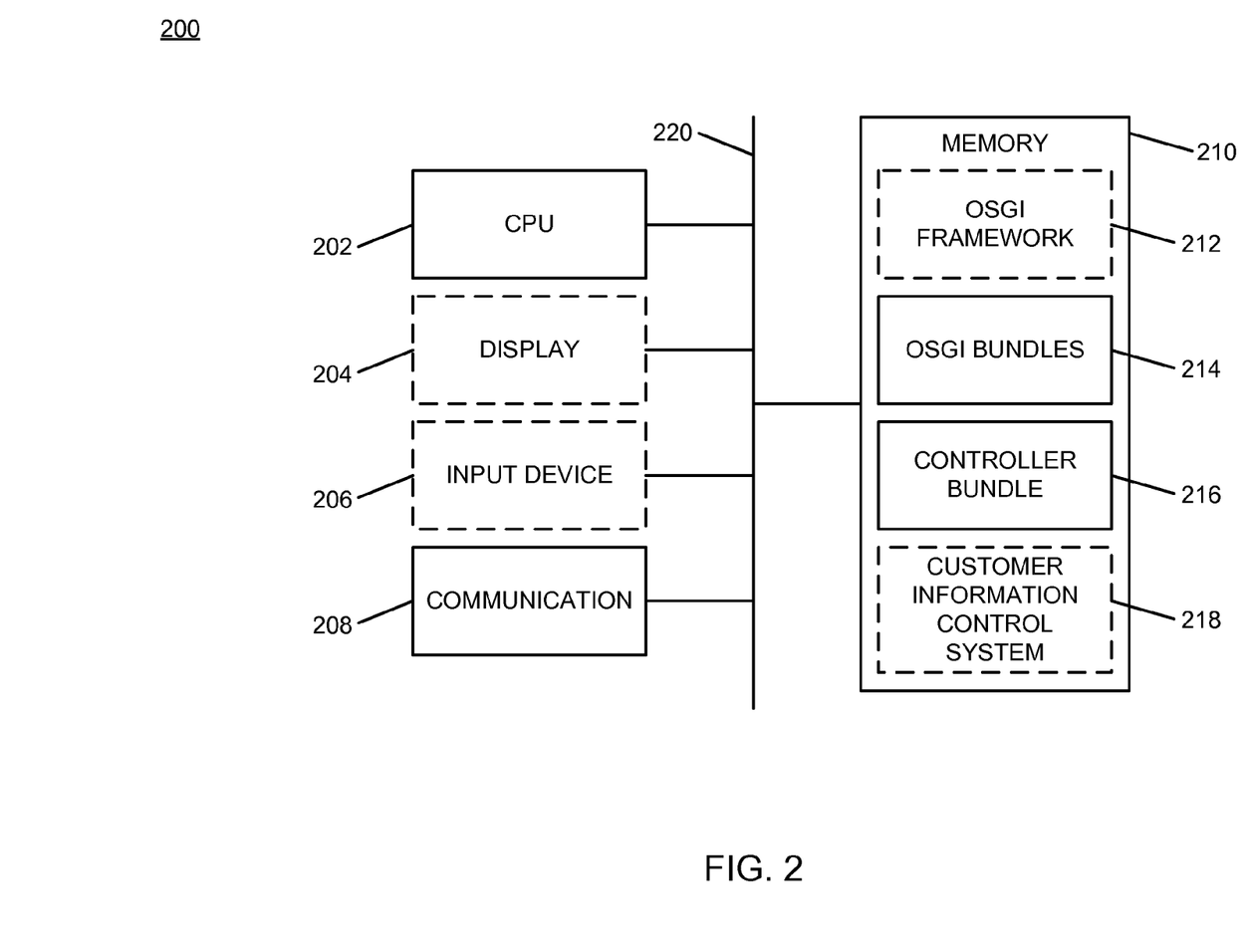
FIG. 2 is a block diagram of an example of an implementation of a core processing module capable of performing automated legacy application integration within a bundle framework according to an embodiment of the present subject matter.

FIG. 2 is a block diagram of an example of an implementation of a core processing module 200 capable of performing automated legacy application integration within a bundle framework. The core processing module 200 may be associated with either the computing device_1 102 through the computing device_N 104 or the server 108, as appropriate for a given implementation. Further, the core processing module 200 may provide different and complementary processing of legacy applications in association with each implementation, as described in more detail below.

For any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.). Further, differences between the implementation of the core processing module 200 for either the computing device_1 102 through the computing device_N 104 or the server 108 will be noted below.

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. For example, where the core processing module 200 is implemented in association with the server 108, the display 204 and the input device 206 may form a part of the server 108 or the server 108 may be remotely accessed for configuration and operation via the network 106. Similarly, where the core processing module 200 is implemented in association with the computing device_1 102 through the computing device_N 104, the display 204 and the input device 206 may form a part of the respective computing devices to allow localized user feedback and input, respectively. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 represents storage for application information, data, and other information for the core processing module 200. It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

The memory 210 includes an OSGI® framework 212. The OSGI® framework 212 includes proxy objects for the legacy applications, as described in more detail below, that are registered within the OSGI® framework. The OSGI® framework 212 is shown with a dashed-line representation to show that this area may exist for those implementations that include an OSGI® framework.

Additionally, an OSGI® bundles storage area 214 stores OSGI® bundles, either as constructed at one of the computing device_1 102 through the computing device_N 104 for upload to the server 108, or at the server 108 for loading and execution within the OSGI® framework 212. It should be noted, as described above and in more detail below, that OSGI® bundles that include legacy Java™ application binaries include an additional manifest header to the manifest file that specifies class entry points for the legacy Java™ application(s) that form a portion of the respective OSGI® bundle(s).

The memory 210 includes a controller bundle 216, either developed at one of the computing device_1 102 through the computing device_N 104 for upload to the server 108, or at the server 108 for loading and execution within the OSGI® framework 212. As described above and in more detail below, the controller bundle 216 is installed within the OSGI® framework 212 as an OSGI® bundle and interfaces with one or more OSGI® bundles that include one or more legacy application binaries and facilitates registration and execution of the legacy application binaries within the OSGI® framework 212.

A customer information control system (CICS®) application area 218 stores and executes a CICS® application for implementations of the server 108 that include transaction processing capabilities. The CICS® application area 218 is shown in a dashed-line representation to show that this area may exist for those implementations that include transaction processing capabilities.

It should be noted that the respective components illustrated and described within the memory 210 may alternatively be implemented as separate components that include any hardware, programmed processor(s), and memory used to carry out the functions of this component as described above and in more detail below. For example, these components may include additional controller circuitry in the form of application specific integrated circuits (ASICs), processors, and/or discrete integrated circuits and components for performing communication and electrical control activities associated with the respective devices. Additionally, the respective components may include interrupt-level, stack-level, and application-level modules as appropriate. Furthermore, the respective components may include any memory components used for storage, execution, and data processing for performing processing activities associated with the component.

Further, the CPU 202 may execute instructions associated with any of the components within the memory 210 to provide the processing capabilities described above and in more detail below for the core processing module 200. The respective components may form a portion of an interrupt service routine (ISR), a portion of an operating system, a portion of a browser application, or a portion of a separate application without departure from the scope of the present subject matter and as appropriate for the given implementation.

The CPU 202, the display 204, the input device 206, the communication module 208, and the memory 210 are interconnected via an interconnection 220. The interconnection 220 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

The following description provides additional detail and examples for implementation of the automated legacy application integration within a bundle framework. The following examples utilize legacy Java™ programming language applications and an OSGI® framework for purposes of description. To initiate the integration of a legacy Java™ programming language application (i.e., written using Java™ programming language), one additional header is added to the manifest file of the OSGI® bundle that includes an executable binary of the legacy Java™ application. For purposes of the examples that follow, this additional header will be referred to as an "extension" header. Within the examples below, the extension header is termed "ExtensionMain-Class." However, it is understood that the name of the additional header may be considered implementation specific and may be changed as appropriate for a given implementation.

The following pseudo syntax provides one possible example of the use of this extension header in a bundle manifest.
Manifest-Version: 1.0
Bundle-ManifestVersion: 2
Bundle-Name: Bundle A
Bundle-SymbolicName: org.bundle.a
Bundle-Version: 1.0.0
Export-Package: org
ExtensionMain-Class: org.LegacyApp, org.LegacyApp_2

It should be noted that this extension header "ExtensionMain-Class" operates to declare one or more entry points of the new OSGI® bundle. Within the present example, two entry points are declared (org.LegacyApp and org.LegacyApp_2). As such, this extension header provides a list of all available entry point classes. Additional details of the use of the entry points declared within this extension header of the example pseudo syntax above will be described beginning with FIG. 3 below. A preliminary description of processing for registration and invocation of legacy Java™ applications within the OSGI® framework 212, is provided below prior to a specific example of each aspect beginning with FIG. 3.

Registration of legacy Java™ applications by the controller bundle 216 involves an OSGI® bundle listener mechanism of the controller bundle 216. The listener mechanism may be implemented, for example, using the OSGI® BundleTracker class. When the listener mechanism is alerted to an OSGI® bundle entering the set of starting and active ("STARTING" and "ACTIVE") bundles, the listener mechanism checks the manifest of the OSGI® bundle and determines whether the manifest of OSGI® bundle includes an extension header, such as the "ExtensionMain-Class" header described within the example pseudo syntax above. If an extension header is found, the controller bundle 216 creates a new proxy object for each of the defined entry point classes identified by the extension header and stores the entry point class name and a reference (e.g., a pointer) to the bundle within the respective proxies. Based upon the extension header within the example pseudo syntax above, two such proxy objects would be created by the processing of the extension header. Each proxy object would identify an entry point as a class name (e.g., org.LegacyApp and org.LegacyApp_2). It should be noted that, in order to ensure that lazy-activation bundles are not prematurely started by loading a class from the respective bundle, only the class name and not the class object is stored within the respective proxy objects. The created proxy object for each identified legacy Java™ application is then registered as an OSGI® service within an OSGI® service registry of the OSGI® framework 212 using the extension header as context for the respective OSGI® bundle, with an additional property that defines the entry point class name.

Starting a legacy Java™ application within an OSGI® framework, such as the OSGI® framework 212, involves an additional aspect of the controller bundle 216 that provides a mechanism for a server, such as the server 108 implemented for example as an application server or transaction processing server, to call a particular entry point class. The server 108 (e.g., the CPU 202) calls the controller bundle 216 and specifies the entry point class name of a legacy Java™ application. The controller bundle 216 searches for proxy objects registered as services within an OSGI® service registry that have an additional property, as described above, that matches the requested class name. In response to identifying a registered service that matches the requested class name, the controller bundle 216 retrieves the requested matching service. The controller bundle 216 uses the bundle object reference stored within the proxy object and the class name stored within the proxy object to load the class and call the specified entry method for the legacy Java™ application.

Figure 3:
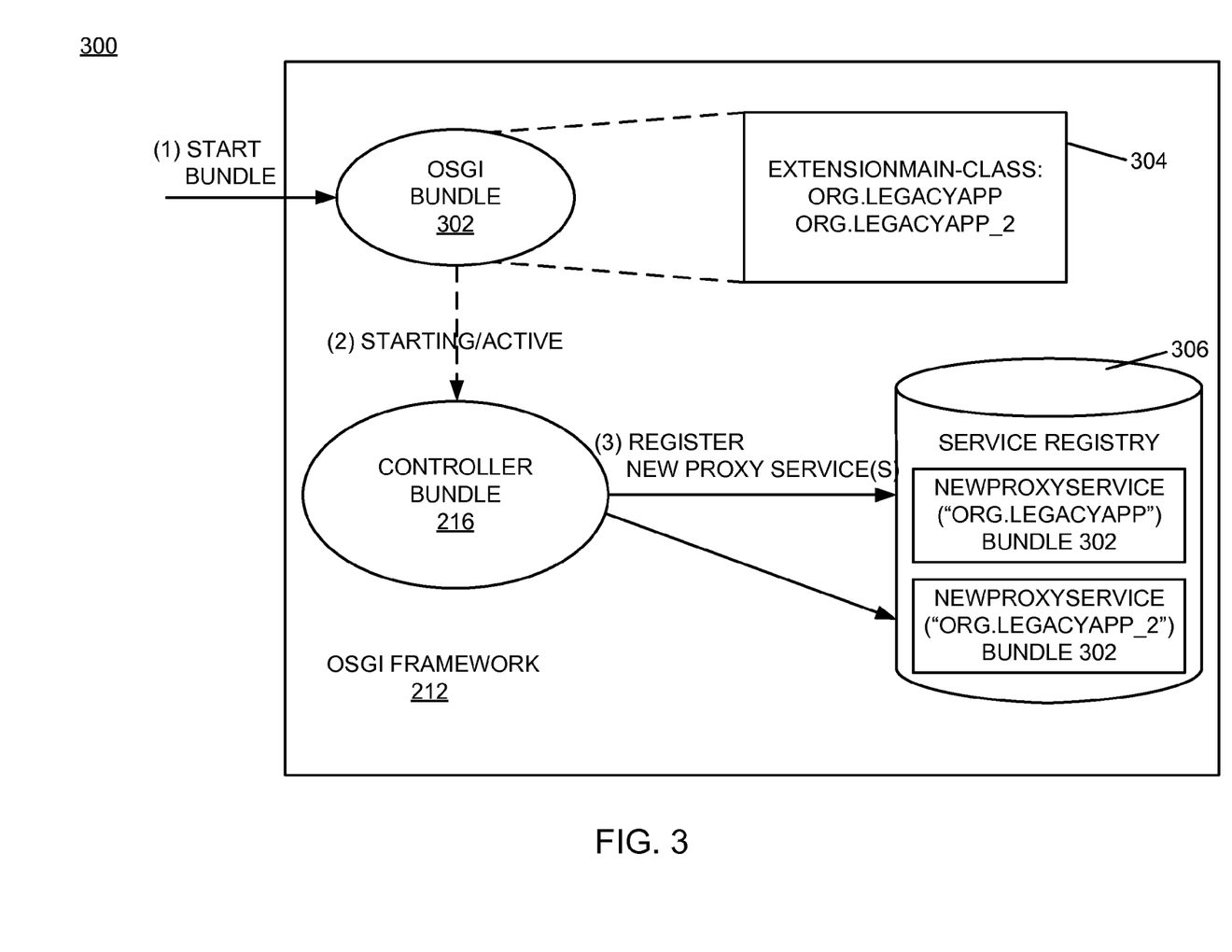
FIG. 3 is a flow diagram of an example of an implementation of a process for registering legacy applications, such as a legacy application developed using the Java™ programming language, within a bundle framework, such as an OSGI® framework according to an embodiment of the present subject matter.
Figure 4:
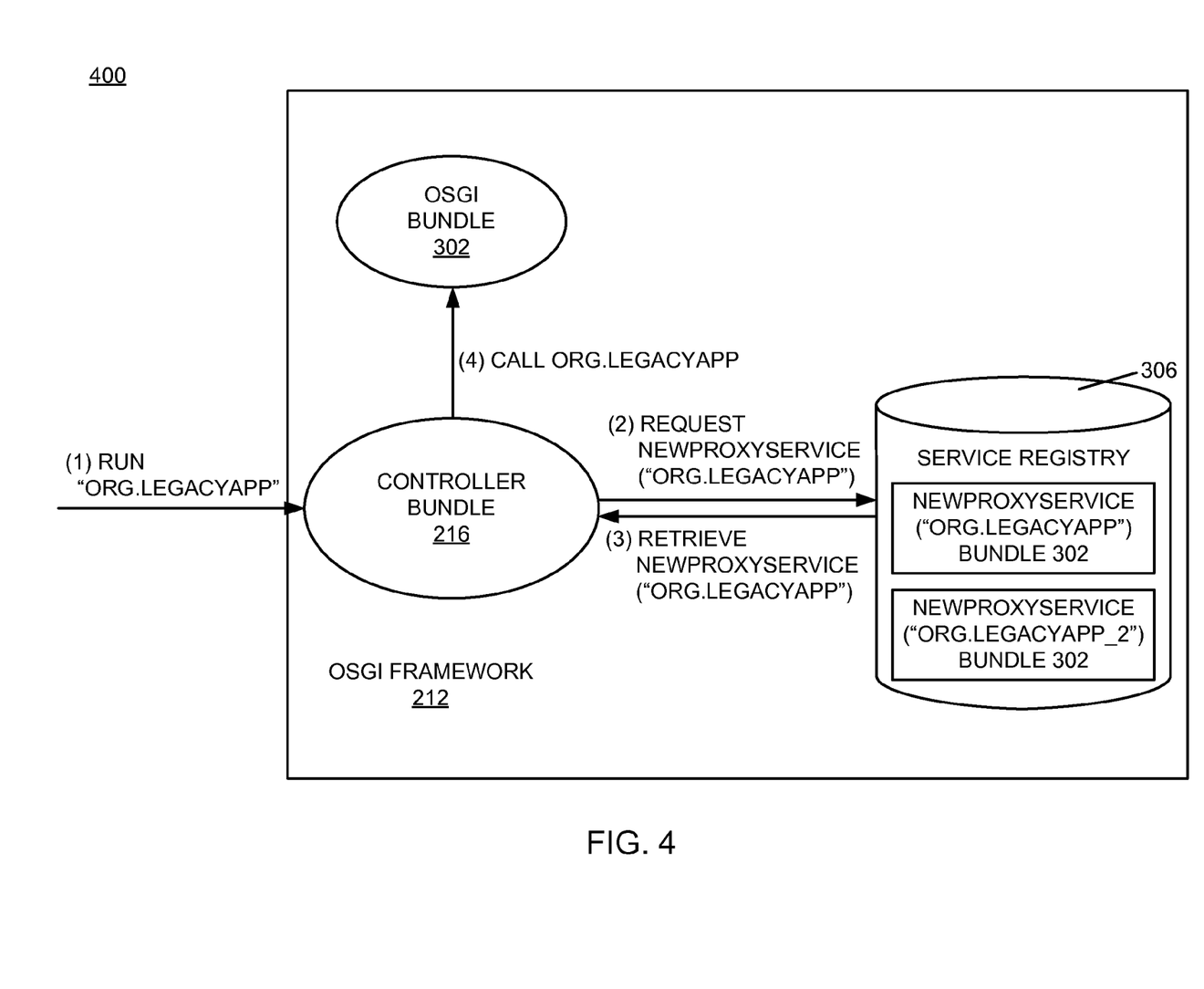
FIG. 4 is a flow diagram of an example of an implementation of a process for invoking legacy applications, such as a legacy application developed using the Java™ programming language, within a bundle framework, such as an OSGI® framework according to an embodiment of the present subject matter.

FIGS. 3 and 4 provide examples of registration and invocation, respectively, of a legacy application by use of a legacy Java™ application for purposes of example. However, it is understood that the present subject matter may be applied to any form of legacy application that may be executed from within an OSGI® bundle. Capital letters are utilized within the drawing figures (e.g., org.LegacyApp is represented as ORG.LEGACYAPP within the drawing figures). However, it is understood that a mixture of upper and lower case may be utilized as appropriate for a given implementation. It is understood that these different representations are equivalent for purposes of the present examples.

FIG. 3 is a flow diagram of an example of an implementation of a process 300 for registering legacy applications, such as a legacy application developed using the Java™ programming language, within a bundle framework, such as the OSGI® framework 212. The example of FIG. 3 utilizes the example pseudo syntax shown and described above. As can be seen from FIG. 3, the controller bundle 216 has been installed within the OSGI® framework 212 (within the memory 210). An OSGI® bundle 302 is shown to include an extension header 304 that includes two binaries for the two legacy applications (e.g., org.LegacyApp and org.LegacyApp_2, as described above). For purposes of the present examples, the legacy applications within the OSGI® bundle 302 represent applications developed using the Java™ programming language.

In response to a "Start Bundle" instruction (Action 1) received by the OSGI® bundle 302, for example from the CPU 202, the controller bundle 216 is alerted that the OSGI® bundle 302 is entering the set of starting and active bundles (Action 2). The controller bundle 216 checks the manifest for the OSGI® bundle 302 and determines whether the manifest of the OSGI® bundle 302 includes the extension header 304. In response to determining that the extension header 304 is present, the controller bundle 216 creates a new proxy object for each of the defined entry point classes (e.g., org.LegacyApp and org.LegacyApp_2) identified by the extension header 304 and stores the entry point class name and a reference (e.g., pointer) to the bundle object within that proxy. The controller bundle 216 registers the created proxy object (Action 3) for each identified legacy application as an OSGI® service within an OSGI® service registry 306 of the OSGI® framework 212 using the extension header 304 as context for the OSGI®bundle 302, with an additional property that defines the entry point class name. It should be noted that each of the registered proxy objects includes both the entry point class name (e.g., org.legacyapp and org.legacyapp_2) and a reference (e.g., bundle 302) to the bundle object. Further, the same bundle 302 is referenced by each registered proxy object.

FIG. 4 is a flow diagram of an example of an implementation of a process 400 for invoking legacy applications, such as a legacy application developed using the Java™ programming language, within a bundle framework, such as the OSGI® framework 212. The example of FIG. 4 also utilizes the example pseudo syntax shown and described above. The controller bundle 216 receives/detects a call from the server 108 such as via the CPU 202 that specifies the entry point class name of a legacy application to invoke (Action 1). In response to receiving/detecting the call to invoke the legacy application, the controller bundle 216 searches for proxy objects registered as services within the OSGI® service registry 306 that have an additional property, as described above, that matches the requested class name (Action 2). In response to identifying a registered service that matches the requested class name, the controller bundle 216 retrieves the requested matching service (Action 3). The controller bundle 216 uses the bundle object reference stored within the proxy object and the class name stored within the proxy object to load the class and call the specified entry method for the legacy application (Action 4).

Removal of the proxy services of the OSGI® bundle 302 from the OSGI® service registry 306 may occur in response to the OSGI® bundle 302 being stopped. This processing may be performed by the controller bundle 216. However, in view of the registration of the services using the bundle context of the OSGI® bundle 302, the services may be effectively removed by the OSGI® framework 212 as the OSGI® bundle 302 is stopped. Any other processing appropriate for a given implementation is considered within the scope of the present subject matter.

Figure 5:
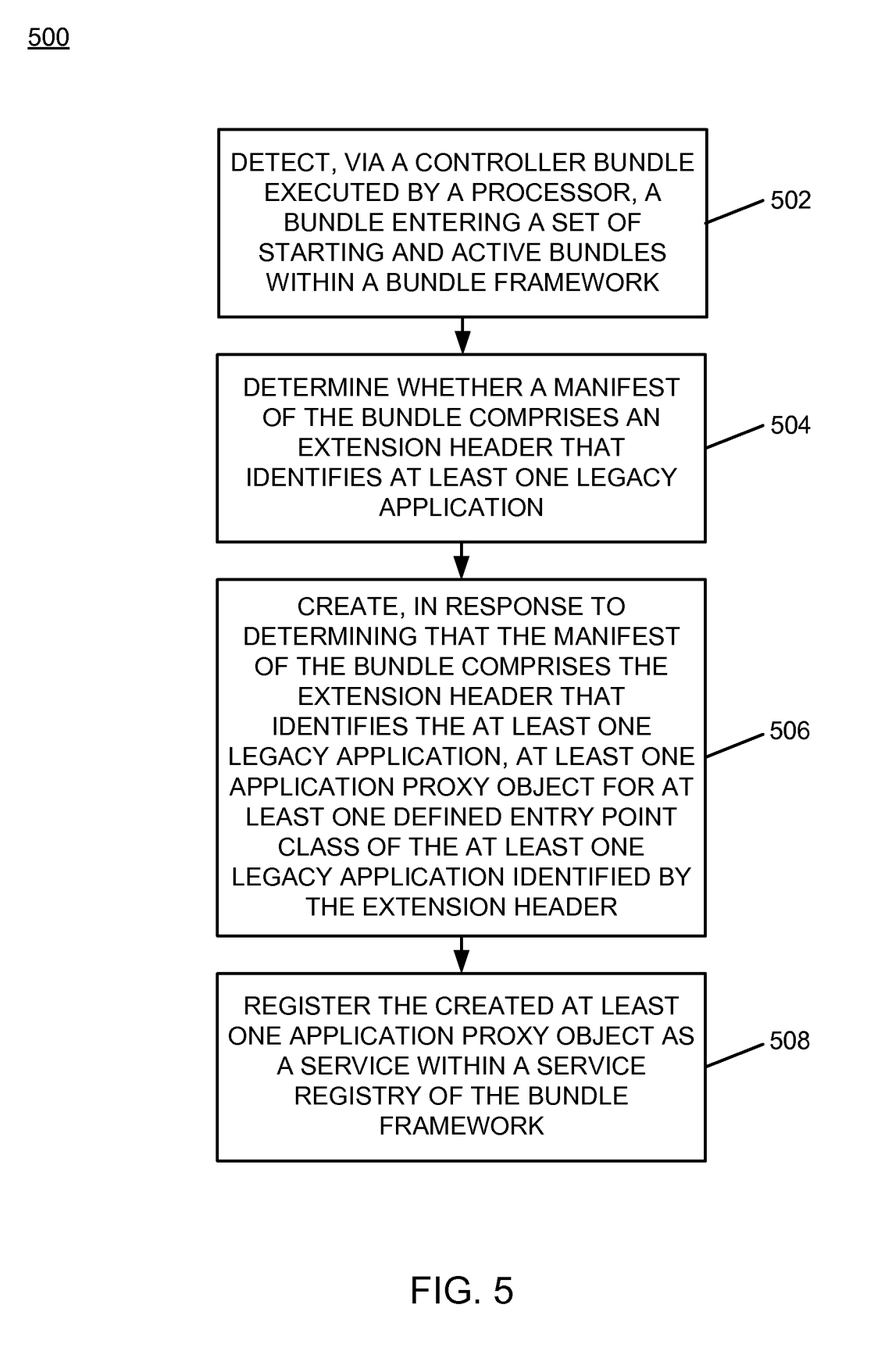
FIG. 5 is a flow chart of an example of an implementation of a process for automated legacy application integration within a bundle framework according to an embodiment of the present subject matter.
Figure 6:
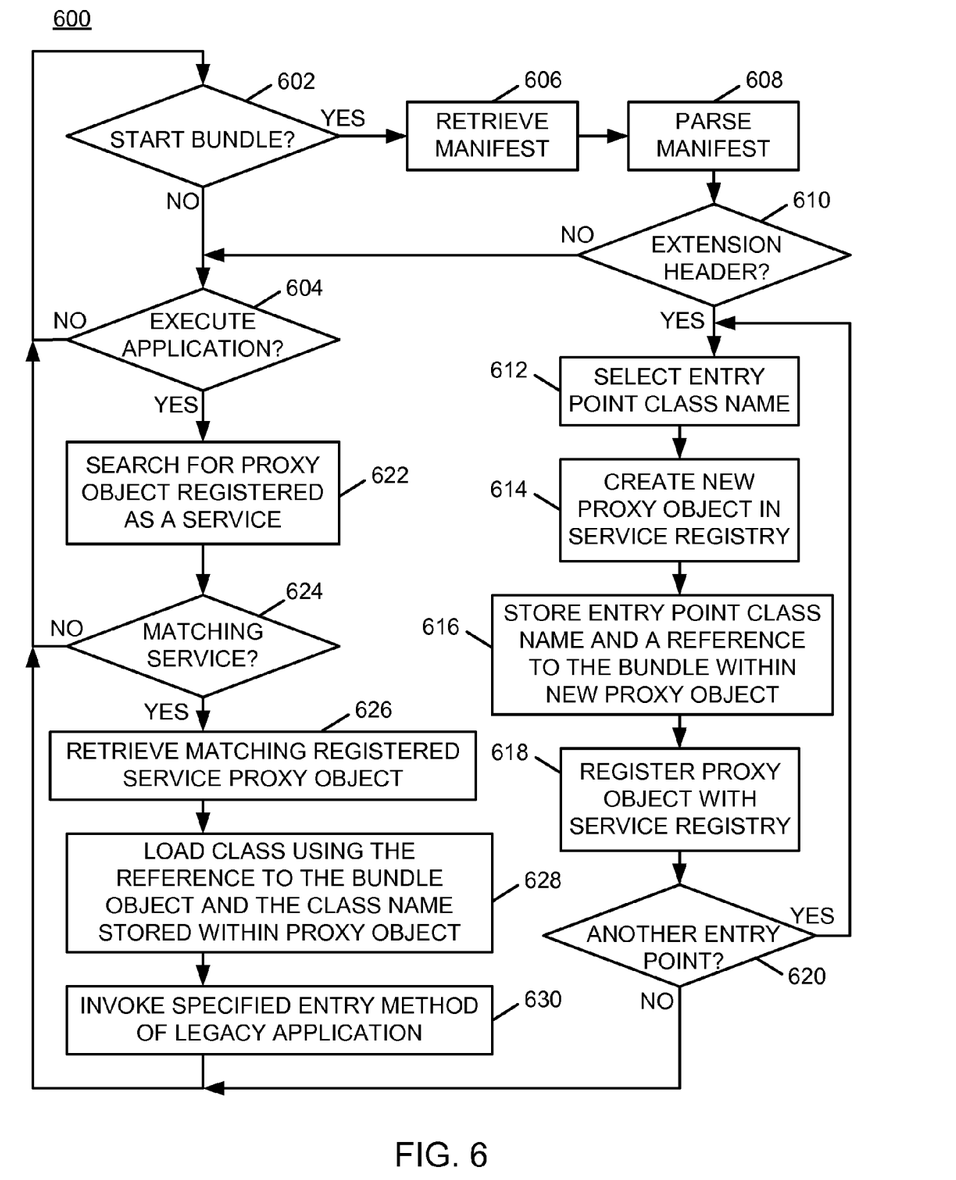
FIG. 6 is a flow chart of an example of an implementation of a process for automated legacy application integration within a bundle framework according to an embodiment of the present subject matter.

FIG. 5 through FIG. 6 described below represent example processes that may be executed by devices, such as the core processing module 200, to perform the automated legacy application integration within a bundle framework associated with the present subject matter. Many other variations on the example processes are possible and all are considered within the scope of the present subject matter. The example processes may be performed by components, such as the controller bundle 216 executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

FIG. 5 is a flow chart of an example of an implementation of a process 500 for automated legacy application integration within a bundle framework. At block 502, the process 500 detects, via a controller bundle executed by a processor, a bundle entering a set of starting and active bundles within a bundle framework. At block 504, the process 500 determines whether a manifest of the bundle comprises an extension header that identifies at least one legacy application. At block 506, the process 500 creates, in response to determining that the manifest of the bundle comprises the extension header that identifies the at least one legacy application, at least one application proxy object for at least one defined entry point class of the at least one legacy application identified by the extension header. At block 508, the process 500 registers the created at least one application proxy object as a service within a service registry of the bundle framework.

FIG. 6 is a flow chart of an example of an implementation of a process 600 for automated legacy application integration within a bundle framework. The process 600 may be executed by a controller bundle, such as the controller bundle 216 executed by a processor such as the CPU 202. It should be noted that the present description is directed to processing to integrate legacy applications written using Java™ programming language into an OSGI® framework, and that processing for loading other applications has been omitted for brevity. However, it is understood that the process 600 may be modified to process other applications without departure from the scope of the present subject matter.

At decision point 602, the process 600 makes a determination as to whether an OSGI® bundle entering a set of starting and active bundles within a bundle framework such as the OSGI® framework 212 has been detected, such as via a controller bundle such as the controller bundle 216 executed by a processor such as the CPU 202. The OSGI® bundle entering a set of starting and active bundles within the OSGI® framework 212 may be detected, for example, in response to receipt of a "Start Bundle" instruction or alert, such as that described in association with FIG. 3 above.

In response to determining that an OSGI® bundle entering the set of starting and active bundles within the OSGI® framework 212 has not been detected, the process 600 begins higher level processing iteration and determines at decision point 604 as to whether a request to execute a specified version of a legacy application has been detected. Detecting a request to execute a legacy application may include, for example, detecting a call to an entry point class that specifies an entry point class name of a legacy application that has been detected via the controller bundle 216 executed by the CPU 202. The call to the entry point class that specifies the entry point class name of the legacy application may be detected, for example, in response to receipt of a "Run" instruction or alert as described in association with FIG. 4 above.

In response to determining that a call to the entry point class that specifies the entry point class name of the legacy application has not been detected, the process 600 returns to decision point 602 and iterates as described above. In response to determining at decision point 602 that an OSGI® bundle entering the set of starting and active bundles within the OSGI® framework 212 has been detected, the process 600 retrieves the manifest of the bundle at block 606. At block 608, the process 600 parses the manifest of the bundle.

At decision point 610, the process 600 makes a determination as to whether an extension header, as described in detail above, has been added to the manifest that includes an executable binary of the legacy application. As described above, the extension header may define one or more entry point classes for each of one or more legacy applications. As such, multiple legacy applications may be defined within the same extension header without departure from the scope of the present subject matter.

In response to determining that an extension header has not been added to the manifest that includes an executable binary of the legacy application, the process 600 returns to decision point 604 and iterates as described above. Additionally, as noted above, the present description is directed to processing to integrate legacy Java™ applications into an OSGI® framework, and processing for loading other applications has been omitted for brevity. However, it is understood that the process 600 may be modified to process other applications without departure from the scope of the present subject matter.

In response to determining at decision point 610 that an extension header has been added to the manifest that includes an executable binary of the legacy application, the process 600 selects a defined entry point class name from the extension header at block 612. At block 614, the process 600 creates a new proxy object within a service registry for the defined entry point class of the legacy application identified by the extension header. At block 616, the process 600 stores an entry point class name of the defined entry point class and a reference to the bundle object within the new proxy object created for that defined entry point class. It should be noted that the process 600 stores the class name and does not store a class object within the respective proxy object. Storage of the class name is sufficient for purposes of the present subject matter. At block 618, the process 600 registers the created application proxy object as a service within the service registry of the bundle framework, such as the OSGI® service registry 306 of the OSGI® framework 212.

At decision point 620, the process 600 makes a determination as to whether another legacy application is identified within the extension header for the bundle. In response to determining that another legacy application is identified within the extension header for the bundle, the process 600 returns to block 612 to select another defined entry point class name from the extension header and iterates as described above to create proxy objects, store entry point classes and a reference (e.g., pointer) to the bundle within the created proxy objects, and register the proxy objects within the service registry for each additional legacy application identified within the extension header. In response to determining that all legacy applications identified within the extension header for the bundle have been processed at decision point 620, the process 600 returns to decision point 602 and iterates as described above.

Returning to the description of decision point 604, in response to determining that a call to an entry point class that specifies an entry point class name of a legacy application has been detected via the controller bundle 216, the process 600 searches for a proxy object registered as a service within the service registry that includes an additional property that matches the requested class name at block 622. At decision point 624, the process 600 makes a determination as to whether the proxy object that is registered as a service within the service registry includes an entry point class name of a legacy application that matches the requested class name.

In response to determining that there is not a proxy object registered as a service within the service registry that includes an entry point class name of a legacy application that matches the requested class name, the process 600 returns to decision point 602 and iterates as described above. It should be noted that processing such as generation of a response message indicating that a matching registered service has not been identified may be completed, as appropriate for a given implementation.

In response to determining at decision point 624 that a proxy object is registered as a service within the service registry that includes an entry point class name of the legacy application that matches the requested class name, the process 600 retrieves the matching registered service proxy object at block 626. At block 628, the process 600 loads the class using the reference to the bundle object stored within the registered proxy object and the class name stored within the proxy object. At block 630, the process 600 issues a call to the loaded class and invokes the specified entry method for the legacy application. The process 600 returns to decision point 602 and iterates as described above.

As such, the process 600 processes started bundles and determines whether an extension header that defines one or more legacy applications, such as applications written using the Java™ programming language, is present within a manifest for the respective bundles. The process 600 creates proxy objects for each entry point class name defined within an extension header of the bundle and registers the proxy objects as services within a service registry of a bundle framework, such as an OSGI® framework. The process 600 also processes requests to execute legacy applications and searches the service registry for proxy objects with entry point class names that match the legacy applications to be executed. The process 600 retrieves, loads, and invokes legacy applications in response to identifying a matching proxy object.

As described above in association with FIG. 1 through FIG. 6, the example systems and processes provide legacy application integration within a bundle framework. Many other variations and additional activities associated with legacy application integration within a bundle framework are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    detecting, via a controller bundle executed by a processor, a bundle entering a set of starting and active bundles within a bundle framework, where the bundle comprises an executable binary file of each of at least one legacy application written for an execution platform other than the bundle framework;
    determining whether a manifest of the bundle comprises an extension header that identifies the at least one legacy application written for the execution platform other than the bundle framework and that identifies at least one defined entry point class of each of the at least one legacy application;
    creating, for each defined entry point class of each of the at least one legacy application in response to determining that the manifest of the bundle comprises the extension header that identifies the at least one legacy application and the defined entry point class of each of the at least one legacy application, a legacy application proxy object to invoke the respective legacy application using the respective at least one defined entry point class identified by the extension header and the respective executable binary file; and
    registering each created legacy application proxy object as a new proxy service within a service registry of the bundle framework, where each new proxy service registered within the service registry is invocable using the respective defined entry point class of the respective legacy application and the respective executable binary file.

2. The method of claim 1, where detecting, via the controller bundle executed by the processor, the bundle entering the set of starting and active bundles within the bundle framework comprises receiving an alert that the bundle is entering the set of starting and active bundles within the bundle framework.

3. The method of claim 1, where determining whether the manifest of the bundle comprises the extension header that identifies the at least one legacy application written for the execution platform other than the bundle framework and that identifies the at least one defined entry point class of each of the at least one legacy application comprises:
    retrieving the manifest of the bundle;
    parsing the manifest of the bundle; and
    determining whether the extension header comprises the executable binary file of each of the at least one legacy application and an identifier of each of the at least one defined entry point class of each of the at least one legacy application.

4. The method of claim 1, where creating, for each defined entry point class of each of the at least one legacy application in response to determining that the manifest of the bundle comprises the extension header that identifies the at least one legacy application and the defined entry point class of each of the at least one legacy application, the legacy application proxy object to invoke the respective legacy application using the respective at least one defined entry point class identified by the extension header and the respective executable binary file comprises:
    for each defined entry point class:
        storing an entry point class name of the defined entry point class within the legacy application proxy object created for that defined entry point class; and
        storing a reference to the bundle within the legacy application proxy object created for that defined entry point class.

5. The method of claim 4, further comprising:
    detecting, via the controller bundle executed by the processor, a call to a specified entry point class with a specified entry point class name of one of the at least one legacy application;
    determining that a registered legacy application proxy object exists as a registered service within the service registry that comprises the specified entry point class name; and
    retrieving the registered service in response to determining that the registered legacy application proxy object exists as the registered service within the service registry that comprises the specified entry point class name.

6. The method of claim 5, further comprising:
    loading the specified entry point class with the specified entry point class name using the reference to the bundle stored within the registered legacy application proxy object; and
    calling an entry method for the one of the at least one legacy application.

7. The method of claim 5, where detecting, via the controller bundle executed by the processor, the call to the specified entry point class with the specified entry point class name of the one of the at least one legacy application comprises receiving a request to execute the one of the at least one legacy application.

8. The method of claim 5, where determining that the registered legacy application proxy object exists as the registered service within the service registry that comprises the specified entry point class name comprises:
    searching the service registry of registered application proxy objects; and identifying the registered legacy application proxy object as one of the registered application proxy objects that comprises an additional property that matches the specified entry point class name.

9. A system, comprising:
a memory that stores a bundle framework; and
a processor programmed to:
  detect, via a controller bundle executed by the processor, a bundle entering a set of starting and active bundles within the bundle framework, where the bundle comprises an executable binary file of each of at least one legacy application written for an execution platform other than the bundle framework;
  determine whether a manifest of the bundle comprises an extension header that identifies the at least one legacy application written for the execution platform other than the bundle framework and that identifies at least one defined entry point class of each of the at least one legacy application;
  create, for each defined entry point class of each of the at least one legacy application in response to determining that the manifest of the bundle comprises the extension header that identifies the at least one legacy application and the defined entry point class of each of the at least one legacy application, a legacy application proxy object to invoke the respective legacy application using the respective at least one defined entry point class identified by the extension header and the respective executable binary file; and
  register each created legacy application proxy object as a new proxy service within a service registry of the bundle framework, where each new proxy service registered within the service registry is invocable using the respective defined entry point class of the respective legacy application and the respective executable binary file.

10. The system of claim 9, where in being programmed to detect, via the controller bundle executed by the processor, the bundle entering the set of starting and active bundles within the bundle framework, the processor is programmed to receive an alert that the bundle is entering the set of starting and active bundles within the bundle framework.

11. The system of claim 9, where in being programmed to determine whether the manifest of the bundle comprises the extension header that identifies the at least one legacy application written for the execution platform other than the bundle framework and that identifies the at least one defined entry point class of each of the at least one legacy application, the processor is programmed to:
  retrieve the manifest of the bundle;
  parse the manifest of the bundle; and
  determine whether the extension header comprises the executable binary file of each of the at least one legacy application and an identifier of each of the at least one defined entry point class of each of the at least one legacy application.

12. The system of claim 9, where in being programmed to create, for each defined entry point class of each of the at least one legacy application in response to determining that the manifest of the bundle comprises the extension header that identifies the at least one legacy application and the defined entry point class of each of the at least one legacy application, the legacy application proxy object to invoke the respective legacy application using the respective at least one defined entry point class identified by the extension header and the respective executable binary file, the processor is programmed to:
  for each defined entry point class:
    store an entry point class name of the defined entry point class within the legacy application proxy object created for that defined entry point class in the memory; and
    store a reference to the bundle within the legacy application proxy object created for that defined entry point class in the memory.

13. The system of claim 12, where the processor is further programmed to:
  detect, via the controller bundle executed by the processor, a call to a specified entry point class with a specified entry point class name of one of the at least one legacy application;
  determine that a registered legacy application proxy object exists as a registered service within the service registry that comprises the specified entry point class name; and
  retrieve the registered service in response to determining that the registered legacy application proxy object exists as the registered service within the service registry that comprises the specified entry point class name.

14. The system of claim 13, where the processor is further programmed to:
  load the specified entry point class with the specified entry point class name using the reference to the bundle stored within the registered legacy application proxy object; and
  call an entry method for the one of the at least one legacy application.

15. The system of claim 13, where in being programmed to detect, via the controller bundle executed by the processor, the call to the specified entry point class with the specified entry point class name of the one of the at least one legacy application, the processor is programmed to receive a request to execute the one of the at least one legacy application.

16. The system of claim 13, where in being programmed to determine that the registered legacy application proxy object exists as the registered service within the service registry that comprises the specified entry point class name, the processor is programmed to:
  search the service registry of registered application proxy objects; and
  identify the registered legacy application proxy object as one of the registered application proxy objects that comprises an additional property that matches the specified entry point class name.

17. A computer program product comprising a non-transitory computer readable storage medium including computer readable program code, where the computer readable program code when executed on a computer causes the computer to:
  detect a bundle entering a set of starting and active bundles within a bundle framework, where the bundle comprises an executable binary file of each of at least one legacy application written for an execution platform other than the bundle framework;
  determine whether a manifest of the bundle comprises an extension header that identifies the at least one legacy application written for the execution platform other than the bundle framework and that identifies at least one defined entry point class of each of the at least one legacy application;
  create, for each defined entry point class of each of the at least one legacy application in response to determining that the manifest of the bundle comprises the extension header that identifies the at least one legacy application and the defined entry point class of each of the at least one legacy application, a legacy application proxy object to invoke the respective legacy application using the respective at least one defined entry point class identified by the extension header and the respective executable binary file; and register each created legacy application proxy object as a new proxy service within a service registry of the bundle framework, where each new proxy service registered within the service registry is invocable using the respective defined entry point class of the respective legacy application and the respective executable binary file.

18. The computer program product of claim 17, where in causing the computer to detect the bundle entering the set of starting and active bundles within the bundle framework, the computer readable program code when executed on the computer causes the computer to receive an alert that the bundle is entering the set of starting and active bundles within the bundle framework.

19. The computer program product of claim 17, where in causing the computer to determine whether the manifest of the bundle comprises the extension header that identifies the at least one legacy application written for the execution platform other than the bundle framework and that identifies the at least one defined entry point class of each of the at least one legacy application, the computer readable program code when executed on the computer causes the computer to:

retrieve the manifest of the bundle;

parse the manifest of the bundle; and determine whether the extension header comprises the executable binary file of each of the at least one legacy application and an identifier of each of the at least one defined entry point class of each of the at least one legacy application.

20. The computer program product of claim 17, where in causing the computer to create, for each defined entry point class of each of the at least one legacy application in response to determining that the manifest of the bundle comprises the extension header that identifies the at least one legacy application and the defined entry point class of each of the at least one legacy application, the legacy application proxy object to invoke the respective legacy application using the respective at least one defined entry point class identified by the extension header and the respective executable binary file, the computer readable program code when executed on the computer causes the computer to:

for each defined entry point class:

store an entry point class name of the defined entry point class within the legacy application proxy object created for that defined entry point class; and store a reference to the bundle within the legacy application proxy object created for that defined entry point class.

21. The computer program product of claim 20, where the computer readable program code when executed on the computer further causes the computer to:

detect a call to a specified entry point class with a specified entry point class name of one of the at least one legacy application;

determine that a registered legacy application proxy object exists as a registered service within the service registry that comprises the specified entry point class name; and retrieve the registered service in response to determining that the registered legacy application proxy object exists as the registered service within the service registry that comprises the specified entry point class name.

22. The computer program product of claim 21, where the computer readable program code when executed on the computer further causes the computer to:

load the specified entry point class with the specified entry point class name using the reference to the bundle stored within the registered legacy application proxy object; and call an entry method for the one of the at least one legacy application.

23. The computer program product of claim 21, where in causing the computer to detect the call to the specified entry point class with the specified entry point class name of the one of the at least one legacy application, the computer readable program code when executed on the computer causes the computer to receive a request to execute the one of the at least one legacy application.

24. The computer program product of claim 21, where in causing the computer to determine that the registered legacy application proxy object exists as the registered service within the service registry that comprises the specified entry point class name, the computer readable program code when executed on the computer causes the computer to:

search the service registry of registered application proxy objects; and identify the registered legacy application proxy object as one of the registered application proxy objects that comprises an additional property that matches the specified entry point class name.

* * * * *